US012168420B2

(12) United States Patent
     Lim

(10) Patent No.: US 12,168,420 B2
(45) Date of Patent: Dec. 17, 2024

(54) ELECTRONIC DEVICE FOR PERFORMING UWB MULTI-RANGING AND OPERATING METHOD THEREOF

(71) Applicant: HYUNDAI MOBIS CO., LTD., Seoul (KR)

(72) Inventor: Jong Chul Lim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 175 days.

(21) Appl. No.: 18/084,661

(22) Filed: Dec. 20, 2022

(65) Prior Publication Data

US 2023/0373439 A1 Nov. 23, 2023

(30) Foreign Application Priority Data

May 19, 2022 (KR) .......................... 10-2022-0061276

(51) Int. Cl.
     *B60R 25/24* (2013.01)
(52) U.S. Cl.
     CPC .......... *B60R 25/245* (2013.01); *B60R 25/241* (2013.01)
(58) Field of Classification Search
     CPC .................................................... B60R 25/245
     See application file for complete search history.

(56) References Cited

U.S. PATENT DOCUMENTS

| 2019/0135229 | A1* | 5/2019 | Ledvina ................. H04L 63/18 |
| 2021/0399761 | A1* | 12/2021 | Parthasarathi ....... H04B 7/0602 |
| 2022/0070613 | A1* | 3/2022 | Barton ................. H04B 1/7163 |
| 2022/0139133 | A1* | 5/2022 | Schober ............. G07C 9/00309 |
| | | | 340/5.61 |
| 2022/0345184 | A1* | 10/2022 | Haslinger ............ H04B 7/0805 |
| 2022/0417856 | A1* | 12/2022 | Al Jurdi ................. H04B 1/719 |
| 2023/0017748 | A1* | 1/2023 | Al Jurdi ............ H04W 52/0248 |
| 2023/0065013 | A1* | 3/2023 | Kim ................... G07C 9/00309 |

FOREIGN PATENT DOCUMENTS

| CN | 117677865 A | * | 3/2024 | .......... G01S 13/765 |
| CN | 118019157 A | * | 5/2024 | .......... H04B 1/7183 |
| KR | 10-2022-0042901 A | | 4/2022 | |

* cited by examiner

*Primary Examiner* — Andrew W Bee
(74) *Attorney, Agent, or Firm* — NSIP Law

(57) ABSTRACT

Disclosed is an electronic device for performing ultra wide band (UWB) multi-ranging. The electronic device includes a communication system that performs UWB communication with multiple terminals and a processor. The multiple terminals include a smart key and at least one digital key. The smart key is a device that is ranged on a one off basis in response to a user input and the at least one digital key includes at least one device that is periodically ranged. The processor set priorities of the plurality of terminals, select one of the plurality of terminals between which pieces of ranging timing overlap based on the priorities of the plurality of terminals when the pieces of ranging timing of the plurality of terminals overlap, and perform ranging on the selected terminal through the communication system.

12 Claims, 5 Drawing Sheets

FIG. 3A

DK ID#1 Priority : 1
DK ID#2 Priority : 2
DK ID#3 Priority : 3
DK ID#4 Priority : 4
RAD Priority : 5

FIG. 3B

ELECTRONIC DEVICE FOR PERFORMING UWB MULTI-RANGING AND OPERATING METHOD THEREOF

CROSS-REFERENCE TO RELATED APPLICATION

This application claims the benefit under 35 USC § 119(a) of Korean Patent Application No. 10-2022-0061276, filed on May 19, 2022, in the Korean Intellectual Property Office, the entire disclosure of which is incorporated herein by reference for all purposes.

BACKGROUND

1. Field

The present disclosure relates to an electronic device for performing ultra wide band (UWB) multi-ranging, which performs control over UWB multi-ranging, and an operating method thereof.

2. Description of Related Art

A smart key system enables a vehicle door to be opened or closed and a vehicle to be started up on the outside without inserting a separate key into a key box of the vehicle or performing a special manipulation for operation of the vehicle. The smart key system may be operated by ranging the digital keys through wireless communication such as a UWB. Various electronic devices supporting wireless communication, such as a smartphone, a wearable device, and a tablet PC, in addition to a key fob may be used as the digital keys instead of smart keys.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided an electronic device for performing ultra wide band (UWB) multi-ranging. The electronic device includes a communication system that performs UWB communication with multiple terminals and a processor. The multiple terminals include a smart key and at least one digital key. The smart key is a device that is ranged on a one off basis in response to a user input and the at least one digital key includes at least one device that is periodically ranged. The processor set priorities of the plurality of terminals, select one of the plurality of terminals between which pieces of ranging timing overlap based on the priorities of the plurality of terminals when the pieces of ranging timing of the plurality of terminals overlap, and perform ranging on the selected terminal through the communication system.

The processors may be further configured to identify a maximum value of a priority capable of being set, and set the maximum value as a priority of the smart key.

The processors may be configured to set a priority of the at least one digital key in an order in which the at least one digital key is connected to the communication system, and assign a lower priority to a digital key that has been earlier connected to the communication system.

The processors may be configured to identify a digital key that has not been selected, among digital keys between which pieces of ranging timing overlap, in response to a determination that the pieces of ranging timing of the digital keys overlap, and reset a priority of the identified digital key.

The processors may be configured to reset the priority of the identified digital key higher than priorities of all of other digital keys.

The processors may be configured to determine whether the reset priority is equal to or higher than a priority of the smart key, and initialize the priorities of all of the digital keys in response to a determination that the reset priority is equal to or higher than the priority of the smart key.

In another general aspect, an operating method of an electronic device for performing ultra wide band (UWB) multi-ranging includes setting, by a processor, priorities of multiple terminals. The multiple terminals include a smart key and at least one digital key. The smart key is a device that is ranged on a one off basis in response to a user input and the at least one digital key includes at least one device that is periodically ranged. The method also includes selecting, by the processor, one of the multiple terminals between which pieces of ranging timing overlap based of the priorities of the plurality of terminals when the pieces of ranging timing of the terminals overlap, and performing ranging on the selected terminal through a communication system performing UWB communication.

Setting the priorities of the multiple terminals may include identifying, by the processor, a maximum value of the priority capable of being set, and setting, by the processor, the maximum value as a priority of the smart key.

Setting the priorities of the multiple terminals may include setting, by the processor, a priority of the at least one digital key in an order in which the at least one digital key is connected to the communication system, and in setting the priority of the at least one digital key, assigning a lower priority to a digital key that has been earlier connected to the communication system.

The method may include identifying, by the processor, a digital key that has not been selected, among digital keys between which pieces of ranging timing overlap, when the pieces of ranging timing of the digital keys overlap, and resetting, by the processor, a priority of the identified digital key.

Resetting the priority of the identified digital key may further include resetting the priority of the identified digital key higher than priorities of all of other digital keys.

The method may further include, after resetting the priority of the identified digital key, determining, by the processor, whether the reset priority is equal to or higher than a priority of the smart key, and initializing, by the processor, the priorities of all of the digital keys when the reset priority is equal to or higher than the priority of the smart key.

Other features and aspects will be apparent from the following detailed description, the drawings, and the claims.

BRIEF DESCRIPTION OF THE DRAWINGS

FIGS. 3A and 3B are diagrams for describing the necessity of an electronic device for performing UWB multi-ranging according to an embodiment of the present disclosure.

Figure 1:
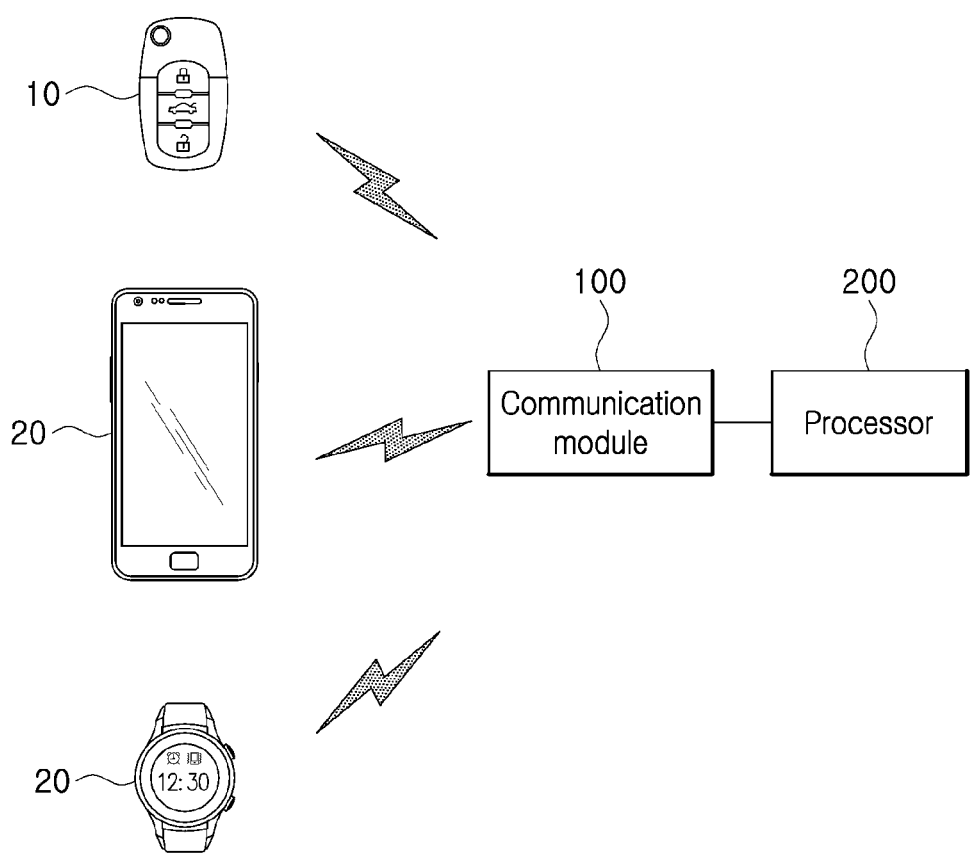
FIG. 1 is a block diagram for describing an electronic device for performing UWB multi-ranging according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is adequately disclosed, and a person with ordinary skill in the art can fully understand the scope of the present disclosure. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The use of the term "up" or "upward" herein is meant to refer to a direction wherein a corresponding vehicle includes wheels on a lower portion of the vehicle compared to a roof of the vehicle in an upper portion of the vehicle.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, an electronic device for performing UWB multi-ranging and an operating method thereof will be described below with reference to the accompanying drawings through various embodiments. In this process, the thicknesses of lines or the sizes of elements illustrated in the drawings may have been exaggerated for the clarity of a description and for convenience' sake. Terms to be described below have been defined by taking into consideration their functions in the present disclosure, and may be changed depending on a user or operator's intention or practice. Accordingly, such terms should be defined based on the overall contents of this specification.

A smart key described in the present embodiment may be defined as a terminal that is ranged by a vehicle on a one off basis in response to a user input. For example, a dedicated terminal for remotely controlling the opening of a vehicle door or the start of a vehicle may correspond to the smart key. If ranging is performed on the smart key, relay attack defense (RAD) for preventing a relay attack may be performed by the vehicle. The number of smart keys which may be ranged by a vehicle may be one, but is not specifically limited.

A digital key described in the present embodiment may be defined as a terminal that is periodically (or consecutively) ranged by a vehicle. For example, an electronic device, such as a smartphone, a tablet PC, or a wearable device in which a dedicated application for controlling a vehicle has been installed, may correspond to the digital key. The digital key may maintain the state in which the digital key has been connected to a vehicle through wireless communication, such as Bluetooth. The number of digital keys which may be ranged by a vehicle may be one or more.

Figure 2:
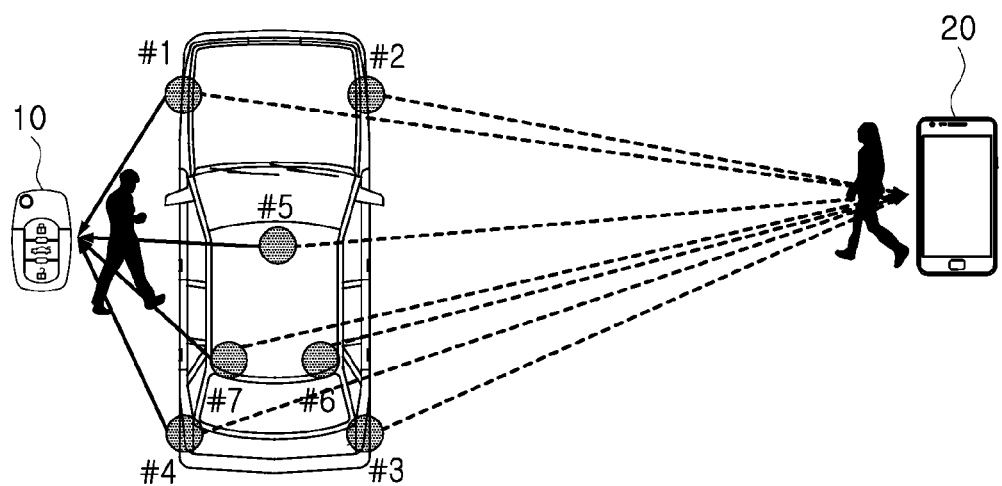
FIG. 2 is a diagram for describing an electronic device for performing UWB multi-ranging according to an embodiment of the present disclosure.

FIG. 1 is a block diagram for describing an electronic device for performing UWB multi-ranging according to an embodiment of the present disclosure. FIG. 2 is a diagram for describing an electronic device for performing UWB multi-ranging according to an embodiment of the present disclosure.

Referring to FIG. 1, the electronic device for performing UWB multi-ranging according to an embodiment of the present disclosure may include a communication module (for example, communication system) 100 and a processor 200. Communication module 100 may include, for example, a transceiver configured to transmit and receive communications. The electronic device for performing UWB multi-ranging according to the present embodiment may be installed within a vehicle, but an installation location thereof is not specifically limited.

The communication module 100 may perform UWB communication with a terminal disposed within a predefined UWB area. In this case, the terminal may be a term that covers both a smart key 10 and a digital key 20. The communication module 100 may include a plurality of anchors, and may perform ranging on a terminal within the UWB area by performing UWB communication with the corresponding terminal through the plurality of anchors under the control of the processor 200 described later. In this case, the ranging may mean an operation of measuring a distance between each of the anchors and the terminal.

The processor 200 is the subject that controls the communication module 100, and may perform ranging on a terminal within a UWB area through the communication module 100. That is, the processor 200 may measure a distance between each anchor and the terminal by performing ranging on the terminal through the plurality of anchors included in the communication module 100. Referring to FIG. 2, if a target terminal to be ranged is the smart key 10, the processor 200 may perform ranging on the target terminal on a one off basis in response to a user input (e.g., an operation of a door open button or start button provided in the smart key being pressed down by a user). In this case, the ranging operation for the terminal may include a RAD operation. Data relating to the RAD operation may be preset and stored in memory of the processor 200. If a target terminal to be ranged is the digital key 20, the processor 200 may periodically perform ranging on the target terminal.

The processor 200 may set priorities for terminals. In this case, the priority may mean a value that is used to determine which terminal has to be ranged if pieces of ranging timing of the terminals overlap.

According to an embodiment, the processor 200 may identify a maximum value of a priority which may be set, and may set the identified maximum value as the priority of the smart key 10. For example, assuming that the range of priorities which may be set by the processor 200 is 1 to 100, the processor 200 may set the priority of the smart key 10 to 100. An operation of setting the priority of the smart key 10 may be performed when the smart key 10 is first connected to the communication module 100, but is not specifically limited.

In general, in the case of the digital key 20, although a ranging operation for terminals is omitted due to an overlap between pieces of ranging timing of the terminals, the ranging operation is performed on the terminals again in a next cycle. Accordingly, an overall ranging operation is not greatly influenced although the ranging operation is temporarily omitted. In contrast, the smart key 10 has a characteristic in that the smart key operates on a one off basis in response to a user input. Accordingly, there is a problem in that a ranging operation itself for the smart key 10 permanently fails if the ranging operation is omitted due to an overlap between pieces of ranging timing of terminals. In order to solve such a problem, according to the present embodiment, if ranging timing of the smart key 10 and ranging timing of the digital key 20 overlap, ranging may be performed on the smart key 10 by setting a maximum value at which the priority of the smart key 10 may be set. Accordingly, reliability of a ranging operation for the smart key 10 can be guaranteed.

According to an embodiment, the processor 200 may set the priority of the digital key 20 based on an order in which the digital key 20 is connected to the communication module 100. In this case, the processor 200 may assign a lower priority to the digital key 20 that has been earlier connected to the communication module 100. For example, the processor 200 may sequentially assign priorities to the digital keys 20 from the lowest priority in an order in which the digital keys 20 are connected to the communication module 100. For example, assuming that the range of priorities which may be set by the processor 200 is 1 to 100, the priority of a first digital key is 1, and the priority of a second digital key is 2, if a third digital key that is a new digital key, is connected to the communication module 100, the processor 200 may set the priority of the third digital key to 3. An operation of setting the priority of the digital key 20 may be performed when the digital key 20 is first connected to the communication module 100, but is not specifically limited.

When pieces of ranging timing of terminals overlap, the processor 200 may select one of the terminals between which the pieces of ranging timing overlap based on the priorities of the terminals, and may perform ranging on the selected terminal. That is, when pieces of ranging timing of terminals overlap, the processor 200 may identify a terminal having a relatively high priority among the terminals between which the pieces of ranging timing overlap, may perform ranging on the identified terminal, and may not perform ranging on other terminals.

When pieces of ranging timing of the digital keys 20 (i.e., when ranging timing of any one digital key 20 and ranging timing of another digital key 20 overlap), the processor 200 may identify a digital key that has not been selected among the digital keys 20 between which the pieces of ranging timing overlap (i.e., a digital key having a relatively low priority among terminals between which ranging timing overlap and a digital key for which ranging has been omitted), and may reset the priority of the identified digital key 20. When pieces of ranging timing of the smart key 10 and the digital key 20 overlap, the processor 200 does not perform an operation of resetting the priority of the digital key 20.

According to an embodiment, the processor 200 may reset the priority of an identified digital key 20 so that the identified digital key 20 has a higher priority than all of other digital keys 20. For example, assuming that while a first digital key having a priority of 1, a second digital key having a priority of 2, and a third digital key having a priority of 3 are ranged by a vehicle, pieces of ranging timing of the first and third digital keys overlap, the processor 200 may reset the priority of the first digital key from 3 to 4. In this case, the increase range of the priority may be variously set within a range in which the priority does not overlap priorities of other digital keys 20. As described above, according to the present embodiment, if ranging for any one digital key 20 is omitted due to an overlap between pieces of ranging timing of digital keys 20, it is possible to prevent the ranging for the digital key 20 from being consistently omitted by resetting the priority of the digital key 20 for which the ranging has been omitted.

The processor 200 may determine whether a reset priority of the digital key 20 is equal to or higher than a priority of the smart key 10 (i.e., a maximum value of a priority that may be set), and may initialize the priorities of all of the digital keys 20 when it is determined that the reset priority of the digital key 20 is equal to or higher than the priority of the smart key 10. If an operation of resetting the priority of the digital key 20 is repeated, there may occur a problem in that a priority set in any one digital key 20 is equal to or higher than a priority set in the smart key 10. In order to prevent the problem, according to the present embodiment, when the reset priority of the digital key 20 (i.e., a priority of a digital key having the highest priority) is equal to or higher than the priority of the smart key 10 or if the priority of the digital key 20 can be no longer increased (i.e., when the priority of a digital key reaches a maximum value that may be set), the priorities of all of the digital keys 20 may be initialized. The processor 200 may initialize the priorities of all of the digital keys 20 by changing the priority of each of the digital keys 20 into a priority that has been first set in the corresponding digital key 20.

As described above, according to the present embodiment, it is possible to prevent ranging for a terminal having low importance from being performed in a situation in which pieces of ranging timing overlap because ranging for a terminal having high importance is preferentially performed over ranging for another terminal when pieces of ranging timing for terminals overlap. Furthermore, according to the present embodiment, it is possible to prevent ranging for any one terminal from consistently failing by resetting the priority of a terminal for which ranging has failed when a ranging failure occurs.

In the aforementioned embodiment, it has been described that the highest priority is assigned to the smart key 10 and priorities are sequentially assigned to the digital keys 20 from the lowest priority. However, a terminal to which the highest priority will be assigned may be changed depending on a user's intention. For example, the highest priority may be assigned to one of the digital keys 20.

Figure 3B:
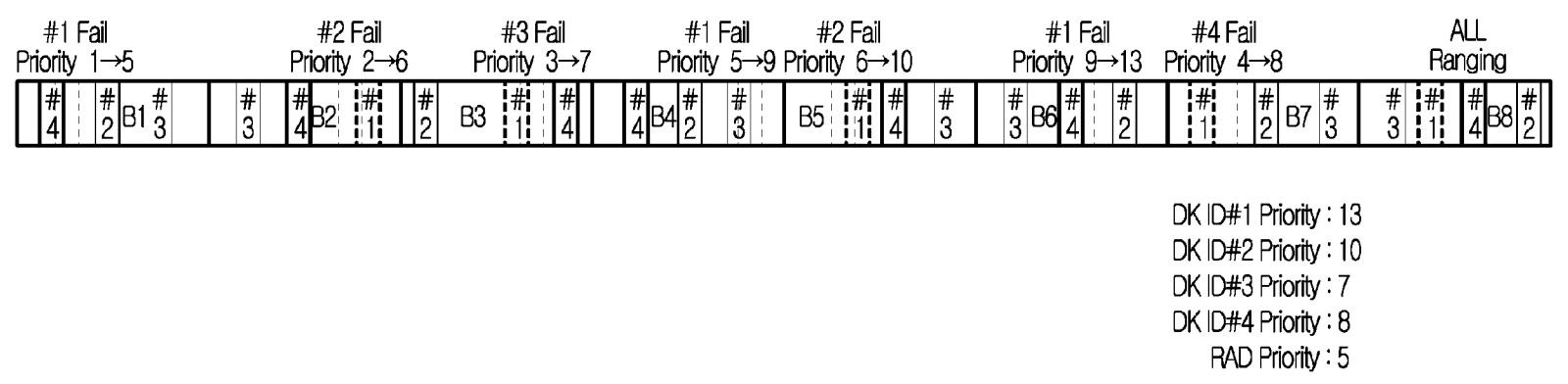

FIGS. 3A and 3B are diagrams for describing that the priority of a digital key needs to be reset and the priority of a digital key needs to be initialized.

FIG. 3A is an embodiment of a conventional electronic device for performing UWB multi-ranging. The conventional electronic device for performing UWB multi-ranging continues to maintain the priorities of the smart key 10 and the digital key 20 that were set at the beginning. Accordingly, there is a possibility that ranging for a specific terminal having a low priority may be consistently omitted when pieces of ranging timing of terminals overlap. For example, as illustrated in FIG. 3A, there is a possibility that ranging for a specific digital key 20 (DK ID #1) having the lowest priority may be consistently omitted.

FIG. 3B is an embodiment of an electronic device to which an algorithm for resetting the priority of a digital key for which ranging has been omitted has been applied. As illustrated in FIG. 3B, if the priority of the digital key 20 for which ranging has been omitted is increased whenever the ranging is omitted, ranging for any one digital key 20 can be prevented from being consistently omitted because the possibility that the ranging will be omitted again is reduced. However, as an operation of resetting the priority of the digital key 20 is repeated, ranging for the smart key 10 may not be smoothly performed because a priority (e.g., DK ID #1 Priority: 13) of the digital key 20 is higher than a priority (RAD Priority: 5) of the smart key 10 that was set at the beginning.

According to an embodiment of the present disclosure, a maximum value of a priority which may be set is set as the priority of the smart key 10. If the priority of the digital key 20 is reset, whether the reset priority of the digital key 20 is higher than the priority of the smart key 10. When the reset priority of the digital key 20 is higher than the priority of the smart key 10, priorities set in all of the digital keys 20 are initialized. Accordingly, the priority of the digital key 20 can be prevented from becoming higher than the priority of the smart key 10.

Figure 4:
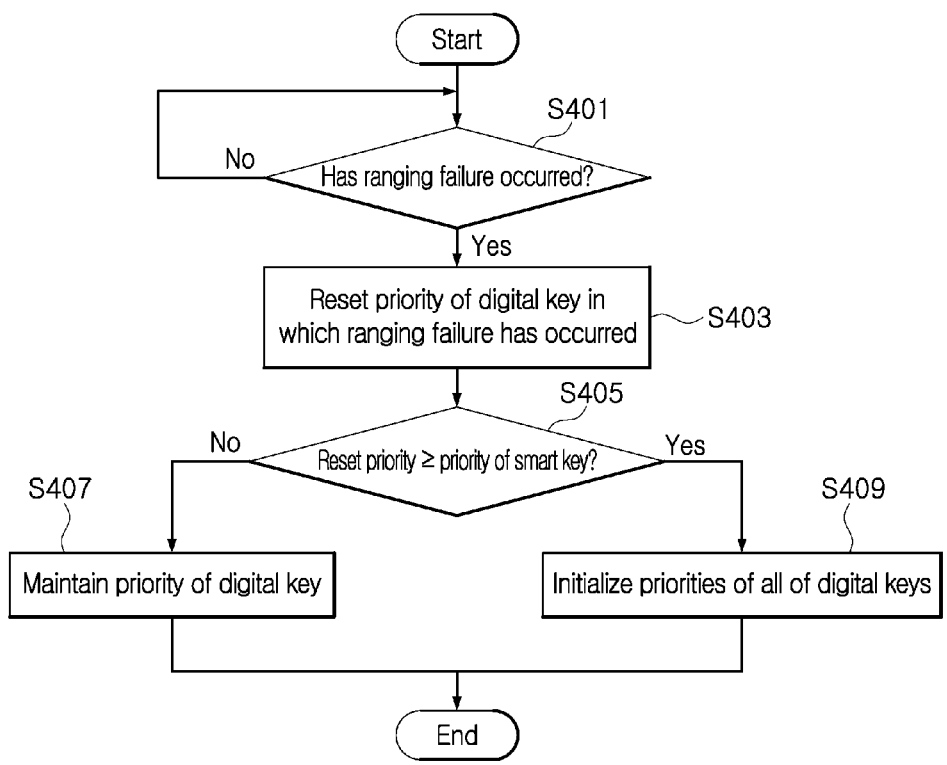
FIG. 4 is a diagram for describing an operating method of an electronic device for performing UWB multi-ranging according to an embodiment of the present disclosure.

FIG. 4 is a flowchart for describing an operating method of an electronic device for performing UWB multi-ranging according to an embodiment of the present disclosure. Hereinafter, the operating method of the electronic device for performing UWB multi-ranging is described with reference to FIG. 4.

First, the processor 200 may determine whether a ranging failure (i.e., ranging omission) has occurred in any one digital key 20 due to an overlap between pieces of ranging timing of the digital keys 20 (S401).

If it is determined that the ranging failure has occurred in any one digital key 20, the processor 200 may reset the priority of the digital key 20 in which the ranging failure has occurred (S403). In this case, the processor 200 may reset the priority of the digital key 20 in which the ranging failure has occurred so that the priority of the digital key 20 becomes higher than the priorities of all of other digital keys 20.

Next, the processor 200 may determine whether the reset priority of the digital key 20 is equal to or higher than the priority of the smart key 10 (S405). The priority of the smart key 10 may be previously set as a maximum value of the priority which may be set by the processor 200.

If it is determined that the reset priority of the digital key 20 is not equal to or higher than the priority of the smart key 10, the processor 200 may maintain the reset priority of the digital key 20 without any change (S407).

In contrast, if it is determined that the reset priority of the digital key 20 is equal to or higher than the priority of the smart key 10, the processor 200 may initialize the priorities of all of the digital keys 20 (S409). In this case, the processor 200 may initialize the priority of each of the digital keys 20 by changing the priority of each of the digital keys 20 into a priority that was set in each digital key 20 at the beginning.

When UWB multi-ranging is performed on terminals each including a smart key and a digital key, a case in which ranging operations for different terminals are simultaneously requested may occur. Conventionally, there is a problem in that ranging for a terminal having relatively high importance is omitted because one of terminals for which ranging has been simultaneously requested is randomly selected and the ranging is performed on the selected terminal without taking into consideration characteristics and importance of the terminal.

As described above, the electronic device for performing UWB multi-ranging and the operating method thereof according to an embodiment of the present disclosure can prevent ranging for a terminal having low importance from being performed in a situation in which pieces of ranging timing of terminals overlap because ranging for a terminal having high importance is preferentially performed over ranging for another terminal when the pieces of ranging timing of terminals overlap. Furthermore, the electronic device for performing UWB multi-ranging and the operating method thereof according to an embodiment of the present disclosure can prevent ranging for any one terminal from consistently failing by resetting the priority of a terminal for which ranging has failed when a ranging failure occurs.

The present disclosure may prevent ranging for a terminal having low importance from being performed in a situation in which pieces of ranging timing overlap because ranging for a terminal having high importance is preferentially performed over ranging for another terminal when pieces of ranging timing for terminals overlap.

The present disclosure may prevent ranging for any one terminal from consistently failing by resetting the priority of a terminal for which ranging has failed when a ranging failure occurs.

Implementations described herein may be realized as a method or process, an apparatus, a software program, a data stream or a signal, for example. Although the present disclosure has been discussed only in the context of a single form of an implementation (e.g., discussed as only a method), an implementation having a discussed characteristic may also be realized in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example. The processor includes a communication device, such as a computer, a cell phone, a mobile phone/personal digital assistant ("PDA") and another device which facilitates the communication of information between end-user.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

The term "module" used in this specification may include a unit implemented as hardware, software or firmware, and may be interchangeably used with a term, such as logic, a logical block, a unit, or a circuit. The module may be an integrated part, or a minimum unit of the part or a part thereof, which performs one or more functions. For example, according to an embodiment, the module may be implemented in the form of an application-specific integrated circuit (ASIC).

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device for performing ultra wide band (UWB) multi-ranging, the electronic device comprising:
a memory configured to store one or more instructions;
a communication system configured to
perform UWB communication with a plurality of terminals, wherein the plurality of terminals comprises a smart key and at least one digital key, wherein the smart key comprises a device that is ranged on a one off basis in response to a user input and the at least one digital key comprises at least one device that is periodically ranged; and
one or more processors configured to execute the one or more instructions to:
set priorities of the plurality of terminals;
select one of the plurality of terminals between which pieces of ranging timing overlap based on the priorities of the plurality of terminals when the pieces of ranging timing of the plurality of terminals overlap, and
perform ranging on the selected terminal through the communication system.

2. The electronic device of claim 1, wherein the one or more processors are configured to:
identify a maximum value of a priority capable of being set, and
set the maximum value as a priority of the smart key.

3. The electronic device of claim 1, wherein the one or more processors are configured to set a priority of the at least one digital key in an order in which the at least one digital key is connected to the communication system, and assign a lower priority to a digital key that has been earlier connected to the communication system.

4. The electronic device of claim 1, wherein the one or more processors are configured to identify a digital key that has not been selected, among digital keys between which pieces of ranging timing overlap, in response to a determination that the pieces of ranging timing of the digital keys overlap, and reset a priority of the identified digital key.

5. The electronic device of claim 4, wherein the one or more processors are configured to reset the priority of the identified digital key higher than priorities of all of other digital keys.

6. The electronic device of claim 4, wherein the one or more processors are configured to determine whether the reset priority is equal to or higher than a priority of the smart key, and initialize the priorities of all of the digital keys in response to a determination that the reset priority is equal to or higher than the priority of the smart key.

7. An operating method of an electronic device for performing ultra wide band (UWB) multi-ranging, the operating method comprising:
setting, by a processor, priorities of a plurality of terminals, wherein the plurality of terminals comprises a smart key and at least one digital key, wherein the smart key comprises a device that is ranged on a one off basis in response to a user input and the at least one digital key comprises at least one device that is periodically ranged;
selecting, by the processor, one of the plurality of terminals between which pieces of ranging timing overlap based on the priorities of the plurality of terminals when the pieces of ranging timing of the terminals overlap; and performing ranging on the selected terminal through a communication system performing UWB communication.

8. The operating method of claim 7, wherein setting the priorities of the plurality of terminals comprises:
identifying, by the processor, a maximum value of the priority capable of being set; and
setting, by the processor, the maximum value as a priority of the smart key.

9. The operating method of claim 7, wherein:
setting the priorities of the plurality of terminals comprises setting, by the processor, a priority of the at least one digital key in an order in which the at least one digital key is connected to the communication system, and
in setting the priority of the at least one digital key, assigning a lower priority to a digital key that has been earlier connected to the communication system.

10. The operating method of claim 7, further comprising:
identifying, by the processor, a digital key that has not been selected, among digital keys between which pieces of ranging timing overlap, when the pieces of ranging timing of the digital keys overlap; and
resetting, by the processor, a priority of the identified digital key.

11. The operating method of claim 10, wherein resetting the priority of the identified digital key further comprises:
resetting the priority of the identified digital key higher than priorities of all of other digital keys.

12. The operating method of claim 10, further comprising:
after resetting the priority of the identified digital key,
determining, by the processor, whether the reset priority is equal to or higher than a priority of the smart key; and
initializing, by the processor, the priorities of all of the digital keys when the reset priority is equal to or higher than the priority of the smart key.

* * * * *